United States Patent
Guerra et al.

(10) Patent No.: US 10,050,982 B1
(45) Date of Patent: Aug. 14, 2018

(54) SYSTEMS AND METHODS FOR REVERSE-ENGINEERING MALWARE PROTOCOLS

(71) Applicant: Symantec Corporation, Mountain View, CA (US)

(72) Inventors: Ruben Torres Guerra, Menlo Park, CA (US); Gaspar Modelo-Howard, Fremont, CA (US); Alok Tongaonkar, San Jose, CA (US); Lorenzo De Carli, Madison, WI (US); Somesh Jha, Madison, WI (US)

(73) Assignee: Symantec Corporation, Mountain View, CA (US)

( * ) Notice: Subject to any disclaimer, the term of this patent is extended or adjusted under 35 U.S.C. 154(b) by 202 days.

(21) Appl. No.: 15/159,187

(22) Filed: May 19, 2016

(51) Int. Cl.
    *H04L 29/06* (2006.01)

(52) U.S. Cl.
    CPC ...... *H04L 63/1416* (2013.01); *H04L 63/0428* (2013.01); *H04L 63/061* (2013.01); *H04L 63/166* (2013.01)

(58) Field of Classification Search
    None
    See application file for complete search history.

(56) References Cited

U.S. PATENT DOCUMENTS

| | | | | |
|---|---|---|---|---|
| 2005/0050338 A1* | 3/2005 | Liang | ...... | G06F 21/56 713/188 |
| 2009/0158430 A1* | 6/2009 | Borders | ...... | G06F 21/552 726/23 |
| 2011/0231659 A1* | 9/2011 | Sinha | ...... | H04L 63/06 713/168 |
| 2012/0079596 A1* | 3/2012 | Thomas | ...... | G06F 21/55 726/24 |
| 2013/0091571 A1* | 4/2013 | Lu | ...... | G06F 21/563 726/23 |
| 2014/0310394 A1* | 10/2014 | Wood | ...... | H04L 43/04 709/224 |
| 2015/0007250 A1* | 1/2015 | Dicato, Jr. | ...... | G06F 21/50 726/1 |

(Continued)

FOREIGN PATENT DOCUMENTS

WO    WO-2015128613 A1 *  9/2015    ......... H04L 63/1408

OTHER PUBLICATIONS

Chia Yuan Cho et al., Inference and Analysis of Formal Models of Botnet Command and Control Protocols, http://www.domagoj-babic.com/uploads/Pubs/CCS10botnets/ccs10botnets.pdf, CCS'10, (Oct. 4-8, 2010).

(Continued)

*Primary Examiner* — Maung T Lwin
(74) *Attorney, Agent, or Firm* — FisherBroyles, LLP (57) ABSTRACT

The disclosed computer-implemented method for reverse-engineering malware protocols may include (1) decrypting encrypted network traffic generated by a malware program, (2) identifying at least one message type field in the decrypted network traffic, (3) identifying at least one message in the decrypted network traffic with the identified message type, and (4) inferring at least a portion of a protocol used by the malware program by analyzing the identified message to identify a field type for at least one data field of the identified message of the identified message type. Various other methods, systems, and computer-readable media are also disclosed.

20 Claims, 7 Drawing Sheets

(56) References Cited

U.S. PATENT DOCUMENTS

2015/0200956 A1* 7/2015 Koide ............... H04L 63/1408
                                                    726/22
2016/0328561 A1* 11/2016 Tamir ................. G06F 21/566

OTHER PUBLICATIONS

Ignacio Bermudez et al., Automatic protocol field inference for deeper protocol understanding, http://ieeexplore.ieee.org/document/7145307/?tp=&arnumber=7145307&url=http:%2F%2Fieeexplore.ieee.org%2Fxpls%2Fabs_all.jsp%3Farnumber%3D3145307, IFIP Networking Conference (IFIP Networking), (May 20-22, 2015).

Guofei Gu et al., BotSniffer: Detecting Botnet Command and Control Channels in Network Traffic, http://faculty.cse.tamu.edu/guofei/paper/Gu_NDSS08_botSniffer.pdf, (2008).

Martin Warmer, Detection of Web Based Command & Control Channels, http://essay.utwente.nl/61232/1/MSc_M_Warmer.pdf, (Nov. 2011).

Paolo Milani Comparetti et al., Prospex: Protocol Specification Extraction, http://ieeexplore.ieee.org/document/5207640/?tp=&arnumber=5207640&url=http:%2F%2Fieeexplore.ieee.org%2Fxpls%2Fabs_all.jsp%3Farnumber%3D5207640, 2009 30th IEEE Symposium on Security and Privacy, (May 17-20, 2009).

Christian Rossow et al., PROVEX: Detecting Botnets with Encrypted Command and Control Channels, http://www.christian-rossow.de/publications/provex-dimva2013.pdf, (2013).

Weidong Cui et al., Discoverer: Automatic Protocol Reverse Engineering from Network Traces, https://www.microsoft.com/en-us/research/publication/discoverer-automatic-protocol-reverse-engineering-from-network-traces/, Proceedings of the 16th USENIX Security Symposium, (Aug. 1, 2007).

Corrado Leita et al, ScriptGen: an automated script generation tool for honeyd, http://www.eurecom.fr/en/publication/1876/download/ce-leitco-051205.pdf, ACSAC, (2005).

Juan Caballero et al., Dispatcher: Enabling Active Botnet Infiltration using Automatic Protocol Reverse-Engineering, http://bitblaze.cs.berkeley.edu/papers/dispatcher_ccs09.pdf, CCS'09, (Nov. 9-13, 2009).

Zhi Wang et al., ReFormat: Automatic Reverse Engineering of Encrypted Messages, https://www.microsoft.com/en-us/research/publication/reformat-automatic-reverse-engineering-of-encrypted-messages/, Proceedings of the 14th European Symposium on Research in Computer Security (ESORICS), (Sep. 1, 2009).

Gilbert Wondracek et al., Automatic Network Protocol Analysis, https://www.cs.ucsb.edu/~chris/research/doc/ndss08_protocol.pdf, NDSS, (2008).

Juan Caballero et al., Binary Code Extraction and Interface Identification for Security Applications, https://software.imdea.org/~juanca/papers/bcr_ndss10.pdf, NDSS (2010).

Konrad Rieck et al., Botzilla: Detecting the "Phoning Home" of Malicious Software, https://user.informatik.uni-goettingen.de/~krieck/docs/2010a-sac.pdf, SAC'10 (Mar. 22-26, 2010).

Christian J. Dietrich et al., CoCoSpot: Clustering and Recognizing Botnet Command and Control Channels using Trac Analysis, http://www.christian-rossow.de/publications/cocospot2012.pdf, Computer Networks, vol. 57, Issue 2, Botnet Activity: Analysis, Detection and Shutdown, (Feb. 4, 2013).

M. Zubair Rafique et al., FIRMA: Malware Clustering and Network Signature Generation with Mixed Network Behaviors, https://drive.google.com/file/d/OBy3t6FUOZ392UjI3dWVPLThYUIE/edit, RAID (2013).

Roberto Perdisci et al., Behavioral Clustering of HTTP-Based Malware and Signature Generation Using Malicious Network Traces, NSDI'10 Proceedings of the 7th USENIX conference on Networked systems design and implementation, (Apr. 28-30, 2010).

Joan Calvet et al., Aligot: Cryptographic Function Identification in Obfuscated Binary Programs, https://hal.inria.fr/hal-00762924/file/fp008-calvet.pdf, CCS'12, (Oct. 16-18, 2012).

* cited by examiner

SYSTEMS AND METHODS FOR REVERSE-ENGINEERING MALWARE PROTOCOLS

BACKGROUND

Some forms of malware use command-and-control (C&C) protocols to manage compromised systems remotely. For example, a botnet is a collection of computers that are remotely managed for a specific purpose. Although the term "botnet" is sometimes used to describe legal, distributed computing systems, the term usually refers to a network of illegally compromised computing systems. Botnets may be used to carry out spam email campaigns or distributed denial-of-service (DDoS) attacks, collect sensitive data, or commit click fraud to manipulate search engine algorithms or increase the advertising value of commercial websites. Botnets typically use a client-server or peer network organization to distribute tasks to be performed by compromised computing systems.

One approach to detecting malware-compromised systems is to detect C&C protocol traffic in a private network. Unfortunately, modern malware systems use custom-designed protocols that may be difficult to identify or understand. Additionally, malware C&C communications are typically encrypted, making detection even more difficult. Accordingly, the instant disclosure identifies and addresses a need for additional and improved systems and methods for reverse-engineering malware protocols.

SUMMARY

As will be described in greater detail below, the instant disclosure describes various systems and methods for reverse-engineering malware protocols by decrypting encrypted network traffic, identifying messages in the network traffic that are included in a malware protocol, and inferring the purpose of data fields within the malware protocol messages. By reverse-engineering the structure and function of messages in a malware protocol, security measures may be developed and implemented to prevent and/or detect malware attacks.

In one example, a computer-implemented method for reverse-engineering malware protocols may include (1) decrypting encrypted network traffic generated by a malware program, (2) identifying one or more message type fields in the decrypted network traffic, (3) identifying one or more messages in the decrypted network traffic with the identified message type, and (4) inferring at least a portion of a protocol used by the malware program by analyzing the identified message to identify a field type for one or more data fields of the identified message of the identified message type.

In some examples, identifying the message type field may include identifying a group of request and response communication pairs in the decrypted network traffic and identifying the message type field by identifying, in one or more subsets of the communication pairs, one or more data field values in each request that corresponds to one or more data field values in each response. In some examples, identifying the message in the decrypted network traffic with the identified message type may include identifying a subset of communication pairs with the data field value in the message type field of the request.

In some examples, identifying the field type of the data field may include (1) determining that the data field contains context-independent data by determining that the field value in the data field is semantically independent from its context in the message, (2) comparing the field value to a range of expected field values for the field type, and (3) identifying the field type based on the field value being within the range of expected field values for the field type. In one embodiment, the context-independent data field may include a magic number, a network address, a time stamp, an executable file, an archive file, and/or a string.

In some examples, identifying the field type of the data field may include (1) determining that the data field contains context-dependent data by determining that the field value in the data field corresponds to at least one of (a) the value of a property of the message and/or (b) a property of a context-independent data field, (2) comparing the field value to a range of expected field values for the identified message, and/or (3) identifying the field type based on the field value being within the range of expected field values for the identified message. In one embodiment, the context-dependent data field may include a CRC value, a field-length value, an array-length value, and/or an offset value. In some examples, identifying the field type of the data field may include determining that the data field contains encrypted data.

In some examples, inferring the portion of the protocol used by the malware program further may include abstracting a specification for the protocol by reporting whether the protocol encrypts all of each message or a portion of each message, reporting an encryption algorithm used by the protocol, reporting at least one encryption key used by the protocol, reporting message type fields used by the protocol, reporting message type values used by the protocol, and/or reporting data field types used by the protocol.

In some examples, decrypting the encrypted network traffic may include (1) identifying one or more sequences of instructions in the malware program that generates encrypted network traffic and/or (2) identifying an encryption algorithm used by the sequence of instructions by (a) identifying data input to the sequence of instructions and data output by the sequence of instructions, (b) identifying a known encryption algorithm that produces the data output by the sequence of instructions when provided the input data, (c) identifying one or more encryption keys for the encrypted network traffic, and (d) decrypting, using the identified encryption key, at least a portion of the encrypted network traffic.

In some examples, identifying the encryption key may include identifying the encryption key in the malware program and/or identifying the encryption key in network traffic generated by the malware program. In some examples, decrypting the encrypted network traffic may include (1) receiving encrypted network traffic collected from the malware program, (2) identifying one or more encryption keys for the encrypted network traffic, and/or (3) decrypting the encrypted network traffic using the identified encryption key. In some examples, identifying the encryption key may include (1) identifying a recognized encryption key known to be used by the malware program and (2) identifying the encryption key by (a) applying one or more of a set of candidate encryption keys to decrypt at least a portion of the encrypted network traffic, (b) calculating an entropy metric for the network traffic decrypted using the candidate encryption key, and/or (c) identifying the encryption key by determining that the entropy metric for the network traffic decrypted using the candidate encryption key is below a threshold.

In one embodiment, a system for implementing the above-described method may include several modules stored in memory, such as (1) a decryption module that decrypts encrypted network traffic generated by a malware program, (2) a message type module that identifies one or more message type fields in the decrypted network traffic, (3) a field type module that identifies one or more messages in the decrypted network traffic with the identified message type, and/or (4) an analysis module that infers at least a portion of a protocol used by the malware program by analyzing the identified message to identify a field type for one or more data fields of the identified message of the identified message type. The system may also include at least one physical processor configured to execute the decryption module, the message type module, the field type module, and the analysis module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) decrypt encrypted network traffic generated by a malware program, (2) identify one or more message type fields in the decrypted network traffic, (3) identify one or more messages in the decrypted network traffic with the identified message type, and (4) infer at least a portion of a protocol used by the malware program by analyzing the identified message to identify a field type for one or more data fields of the identified message of the identified message type.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for reverse-engineering malware protocols. As will be explained in greater detail below, the disclosed systems and methods may analyze and reverse-engineer malware protocols with little or no direct involvement by human experts. Specifically, the disclosed systems and methods may identify an encryption algorithm and one or more encryption keys used to encrypt network traffic generated by a malware program and use the identified encryption parameters to decrypt the encrypted network traffic. The disclosed systems and methods may also identify one or more message types within the decrypted network traffic. In addition, the disclosed systems and methods may identify the location, size, and type of one or more data fields within the messages. After identifying components of a malware protocol, the disclosed systems and methods may produce an abstract of the malware protocol that may be used to develop or improve malware detection systems.

The following will provide, with reference to FIGS. 1, 2, 4, and 5 detailed descriptions of exemplary systems for reverse-engineering malware protocols. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 6 and 7, respectively.

Figure 1:
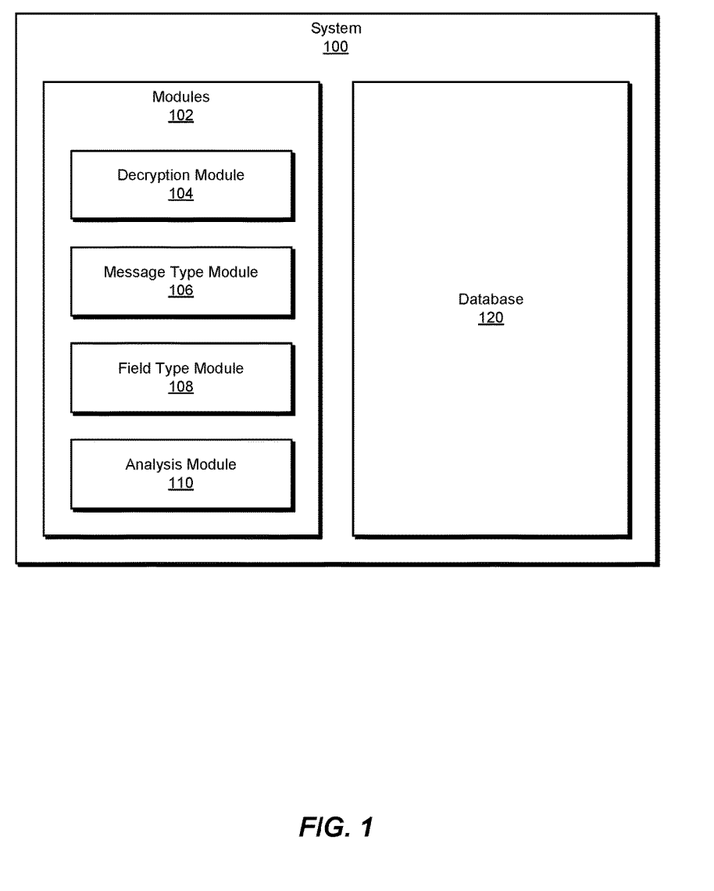
FIG. 1 is a block diagram of an exemplary system for reverse-engineering malware protocols.

FIG. 1 is a block diagram of exemplary system 100 for reverse-engineering malware protocols. As illustrated in this figure, exemplary system 100 may include one or more modules 102 for performing one or more tasks. For example, and as will be explained in greater detail below, exemplary system 100 may include a decryption module 104 that decrypts encrypted network traffic generated by a malware program. Exemplary system 100 may additionally include a message type module 106 that identifies at least one message type field in the decrypted network traffic. Exemplary system 100 may also include a field type module 108 that identifies at least one message in the decrypted network traffic with the identified message type. Exemplary system 100 may additionally include an analysis module 110 that infers at least a portion of a protocol used by the malware program by analyzing the identified message to identify a field type for at least one data field of the identified message of the identified message type. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store malware protocol data, malware signatures, and/or malware executable files. Database 120 may represent portions of a single database or computing device or a plurality of databases or computing devices. For example, database 120 may represent a portion of server 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as server 206 in FIG. 2, computing system 610 in FIG. 6, and/or portions of exemplary network architecture 700 in FIG. 7.

Figure 2:
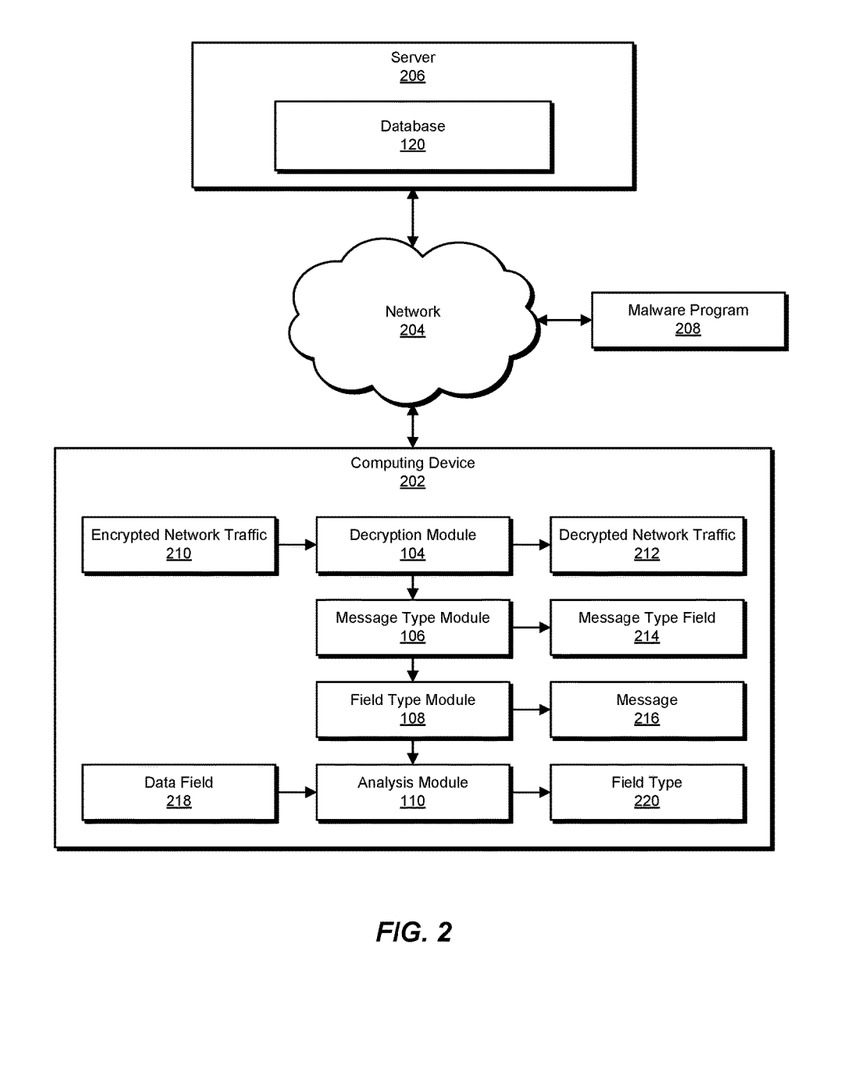
FIG. 2 is a block diagram of an additional exemplary system for reverse-engineering malware protocols.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing device 202 and/or server 206, enable computing device 202 and/or server 206 to reverse-engineer malware protocols. For example, and as will be described in greater detail below, one or more of modules 102 may cause computing device 202 and/or server 206 to reverse-engineering malware protocols. For example, and as will be described in greater detail below, decryption module 104 may decrypt encrypted network traffic 210 generated by a malware program 208 to produce decrypted network traffic 212. Message type module 106 may identify at least one message type field 214 in decrypted network traffic 212. Field type module 108 may identify at least one message 216 in decrypted network traffic 212 with the identified message type. Analysis module 110 may infer at least a portion of a protocol used by malware program 208 by analyzing the identified message 216 to identify a field type 220 for at least one data field 218 of identified message 216 of the identified message type.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Server 206 generally represents any type or form of computing device that is capable of communicating, storing, and/or comparing data. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

Figure 3:
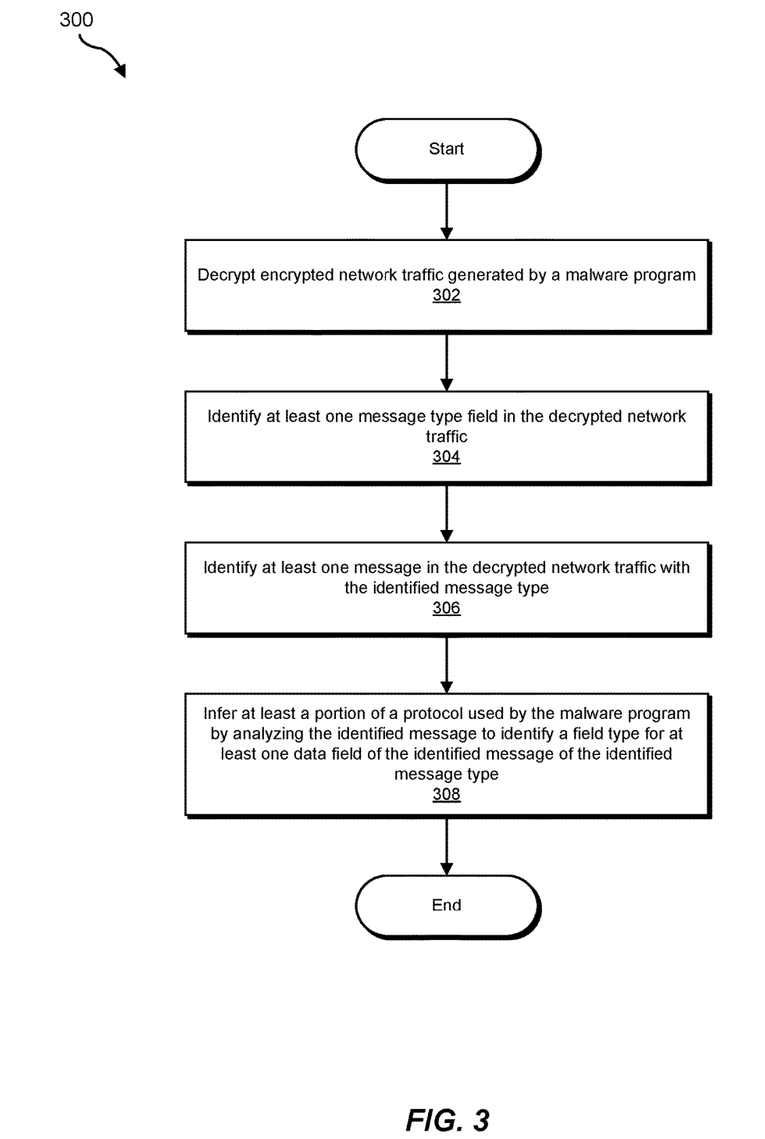
FIG. 3 is a flow diagram of an exemplary method for reverse-engineering malware protocols.

FIG. 3 is a flow diagram of an exemplary computer-implemented method 300 for reverse-engineering malware protocols. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may decrypt encrypted network traffic 210 generated by a malware program. For example, decryption module 104 may, as part of computing device 202 in FIG. 2, decrypt encrypted network traffic 210 generated by malware program 208 to produce decrypted network traffic 212.

Decryption module 104 may decrypt encrypted network traffic in a variety of ways. For example, if a copy of the malware executable is available, decryption module 104 may trace execution of the malware program in a protected environment. Decryption module 104 may identify one or more sequences of instructions in the malware program that generates encrypted network traffic and capture the network traffic generated. By analyzing the execution trace of the malware program and comparing data read by the sequence of instructions to network traffic generated by the sequence of instructions, decryption module 104 may identify a known encryption algorithm that produces the data output by the sequence of instructions when provided the input data. For example, decryption module 104 may determine that the malware program encrypts data to be transmitted by using a bitwise exclusive-or to combine the input data with an encryption key. In another example, decryption module 104 may determine that the malware program encrypts data using a similar encryption algorithm known as Rivest Cipher 4 (RC4) that uses a randomly generated encryption key.

By restricting the encryption analysis only to instruction sequences that generate network traffic, decryption module 104 may identify the encryption algorithm used by the malware program more efficiently than if a larger number of instruction sequences were analyzed. In addition to identifying the encryption algorithm used, decryption module 104 may determine whether the malware program encrypts complete messages or just certain fields within a message. As will be described in greater detail below in conjunction with identifying the encryption algorithm used by the malware program, decryption module 104 may identify at least one encryption key for the encrypted network traffic. Using the identified encryption algorithm and encryption key, decryption module 104 may then decrypt at least a portion of the encrypted network traffic.

Because malware programs utilize encryption keys in various ways, decryption module 104 may identify encryption keys used by a malware program in a variety of ways. For example, malware programs may use a static key found somewhere in a malware program executable. In these examples, decryption module 104 may identify the encryption key by identifying the encryption key in the malware program. In other examples, a malware program may receive one or more encryption keys from another device, or may generate an encryption key and transmit the key to another device. In these examples, decryption module 104 may identify the encryption key in network traffic transmitted or received by the malware program.

In one embodiment, decryption module 104 may not have access to the malware executable program and therefore may not be able to utilize execution trace analysis to identify the encryption algorithm and encryption keys used by the malware program. In some examples, decryption module 104 may decrypt the encrypted network traffic by receiving encrypted network traffic collected from the malware program. For example, decryption module 104 may receive encrypted network traffic collected by an anti-malware program or other network analysis or security system.

In some examples, decryption module 104 may identify the encryption key by identifying the malware program and then identifying a recognized encryption algorithm and encryption keys known to be used by the malware program. For example, decryption module 104 may identify the malware program by analyzing the structure or content of the encrypted network traffic. Decryption module 104 may also receive identification of the malware program from the anti-malware system that collected the encrypted network traffic. Decryption module 104 may identify the encryption key used by an identified malware program by applying one or more of a set of candidate encryption keys to decrypt at least a portion of the encrypted network traffic. Decryption module 104 may then calculate an entropy metric for the network traffic decrypted using the candidate encryption key and identify the encryption key by determining that the entropy metric for the network traffic decrypted using the candidate encryption key is below a threshold. Because the process of decryption reduces randomness or disorder in the encrypted text, decryption module 104 may determine that the correct encryption algorithm and encryption keys have been identified by determining that a measure of the entropy in a decrypted message is below a threshold.

At step 304, one or more of the systems described herein may identify at least one message type field in the decrypted network traffic. For example, message type module 106 may, as part of computing device 202 in FIG. 2, identify at least one message type field 214 in decrypted network traffic 212.

The term "message type field" as used herein generally refers to one or more data fields within a message that indicates the message's purpose. For example, a malware program running on a compromised computer system may be part of a botnet that generates spam email. The malware program may send messages to a server requesting content for email messages to be sent or a list of email addresses to which the email messages should be sent. The malware program may include a numeric value in a particular field of the request message that indicates the nature of the request. More complex malware protocols may include fields that indicate both a message type and subtype.

Message type module 106 may identify a message type field in a variety of ways. For example, message type module 106 may identify the message type field by first identifying a plurality of request and response communication pairs in the decrypted network traffic. The term "communication pair," as used herein, generally refers to corresponding request and response messages between a malware program running on a client and another computing device. For example, a botnet client may request that a server send an executable program to execute on a compromised computing system. The server may then respond with the executable program. In this example, the request and response messages constitute a communication pair. In some examples, message type module 106 may identify request and response communication pairs by the timing of messages transmitted between computing devices.

After identifying a set of paired request and response messages, message type module 106 may then apply a heuristic based on a knowledge of malware C&C protocols that identifies likely locations in malware messages where a message type field may be located. For example, several malware protocols begin with a magic number field that identifies the message protocol, followed by a message type field, or by a CRC value for the message, followed by a message type field. Message type module 106 may then identify the message type field by identifying, in one or more subsets of the communication pairs, one or more data field values in each request that corresponds to one or more data field values in each response. Message type module 106 may identify the corresponding message type fields by first identifying data fields containing a small number of values. Message type module 106 may then identify the message type field by identifying data fields in the request and response communication pairs that are causally related, i.e., data fields in which certain values in the request message imply certain values in data fields in the response message.

Figure 4:
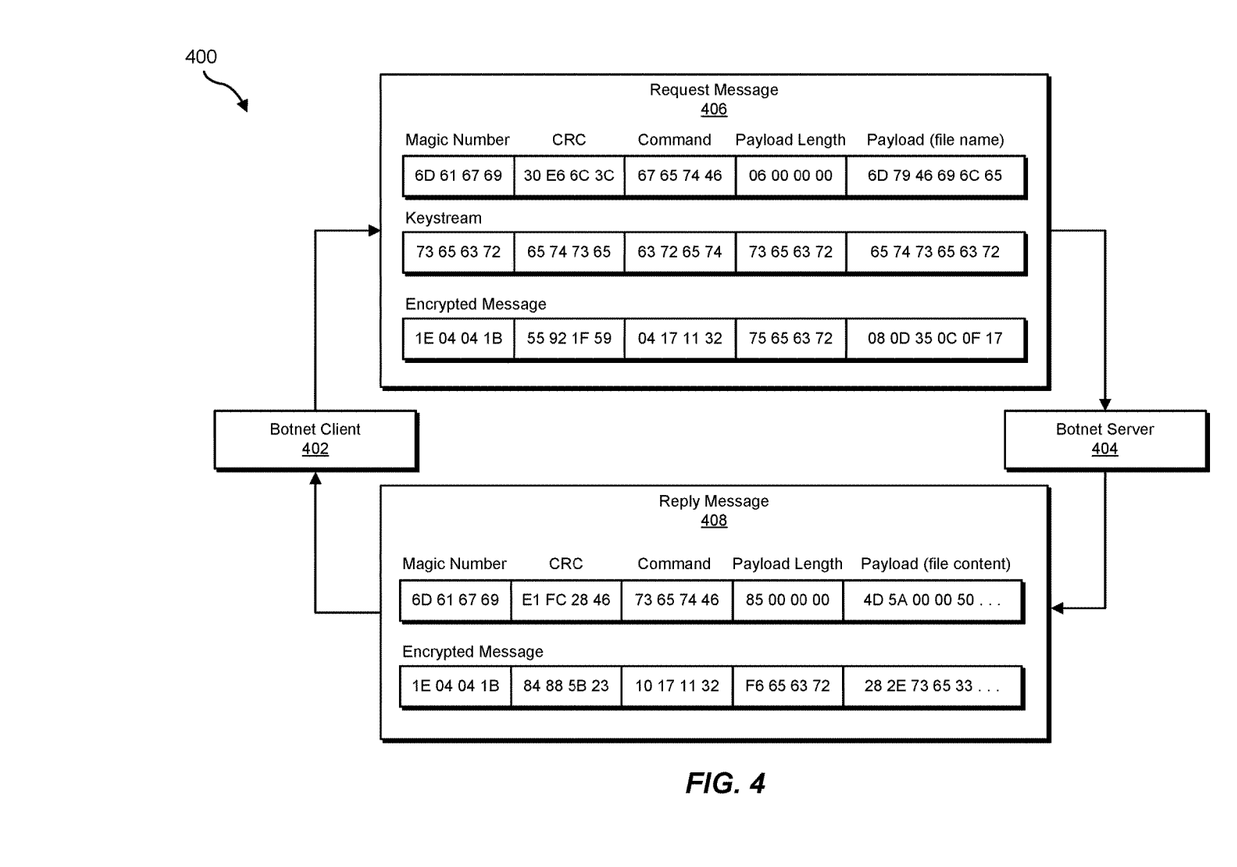
FIG. 4 is a block diagram of exemplary request and reply messages of a malware protocol.

FIG. 4 is a block diagram of exemplary request and reply messages 400 of a malware protocol. As shown in FIG. 4, botnet client 402 may transmit request message 406 to botnet server 404. In response, botnet server 404 may send reply message 408 to botnet client 402. Request message 406 may include a magic number field that identifies messages of the botnet protocol, a CRC field used to verify that the message was not corrupted during transmission, a command field that indicates the message type, a payload length field that indicates the length of the following payload field, and a payload field that contains the name of a file ("my-File") that botnet client 402 is requesting from botnet server 404. The fields of reply message 408 are much the same as those of request message 406, with the exception that instead of a file name, the payload field contains the file named in the payload field of request message 406.

At step 306, one or more of the systems described herein may identify at least one message in the decrypted network traffic with the identified message type. For example, field type module 108 may, as part of computing device 202 in FIG. 2, identify at least one message 216 in the decrypted network 204 traffic with the message type identified in message type field 214.

Field type module 108 may identify messages in the decrypted network traffic with the identified message type in a variety of ways. For example, once message type module 106 had identified the location of a message type field in a set of communication pairs, field type module 108 may identify in the decrypted network traffic additional communication pairs with the identified message type field value in the message type field of the request.

At step 308, one or more of the systems described herein may infer at least a portion of a protocol used by the malware program by analyzing the identified message to identify a field type for at least one data field of the identified message of the identified message type. For example, analysis module 110 may, as part of computing device 202 in FIG. 2, infer at least a portion of a protocol used by malware program 208 by analyzing the identified message 216 to identify field type 220 for at least one data field 218 of the identified message 216 of the identified message type.

Analysis module 110 may infer portions of the protocol used by the malware program in a variety of ways. For example, analysis module 110 may identify the field type of the data field by first determining that the data field contains context-independent data. The term "context-independent," as used herein, generally refers to data fields where the content of the field is semantically independent from the data in the rest of the message. For example, a magic number field may identify the protocol used by the message, and the value may remain unchanged regardless of the data in other message fields. Other examples of context-independent data fields may include network addresses, time stamps, executable or archive files, and strings.

Analysis module 110 may determine that the data field contains context-independent data by determining that the field value in the data field is semantically independent from its context in the message. For example, analysis module 110 may determine that a data field contains the same value regardless of data in the rest of the message, as with a magic number. In another example, analysis module 110 may determine that a data field contains different values for every message type, as with a time stamp.

After determining that the data field contains context-independent data, analysis module 110 may compare the field value to a range of expected field values for the field type. Analysis module 110 may then identify the field type based on the field value being within the range of expected field values for the field type. For example, analysis module 110 may evaluate the data field as a string of characters to determine whether the field contains a string. In another example, analysis module 110 may determine whether the field is the size of a network address and contains values that may represent a valid network address.

In some examples, analysis module 110 may identify the field type of the data field by determining that the data field contains context-dependent data. The term "context-dependent," as used herein, generally refers to data fields where the content of the field depends on a property of the message or a property of a context-independent data field in the message. For example, a field-length value may indicate the number of bytes of data in another data field. In another example, a CRC field may contain a CRC value for a payload portion of a message. Other examples of context-dependent data fields may include array-length values and offset values.

Analysis module 110 may determine that the data field contains context-dependent data by determining that the field value in the data field is dependent on a property of the message. In some examples, analysis module 110 may determine that the data field contains context-dependent data by determining that the content of the data field depends on the content of another data field in the message. After determining that the data field contains context-dependent data, analysis module 110 may compare the field value to a range of expected field values for the identified message. Analysis module 110 may then identify the field type based on the field value being within the range of expected field values for the identified message. For example, analysis module 110 may determine that a data field represents the length of another data field in the message. In another example, analysis module 110 may determine that a data field represents a CRC value for one or more other data fields in the message.

In some examples, analysis module 110 may identify the field type of the data field by determining that the data field contains encrypted data. For example, analysis module 110 may determine that the contents of a data field does not match the syntax of other recognized data types and/or that the contents of the data field display a degree of randomness associated with encrypted data. Analysis module 110 may also use the results of an execution trace of a malware program to determine that a data field contains encrypted data.

In some examples, analysis module 110 may abstract a specification for the protocol used by the malware program. For example, analysis module 110 may report encryption information for the malware program, such as whether the protocol encrypts all of each message or a portion of each message, the encryption algorithm used by the protocol, and/or one or more encryption keys used by the protocol. Analysis module 110 may also report the location and values for one or more message type fields for the protocol. Additionally, analysis module 110 may report data field types used by the protocol. An example of a protocol specification abstract for a portion of a malware protocol is shown in FIG. 5.

Figure 5:
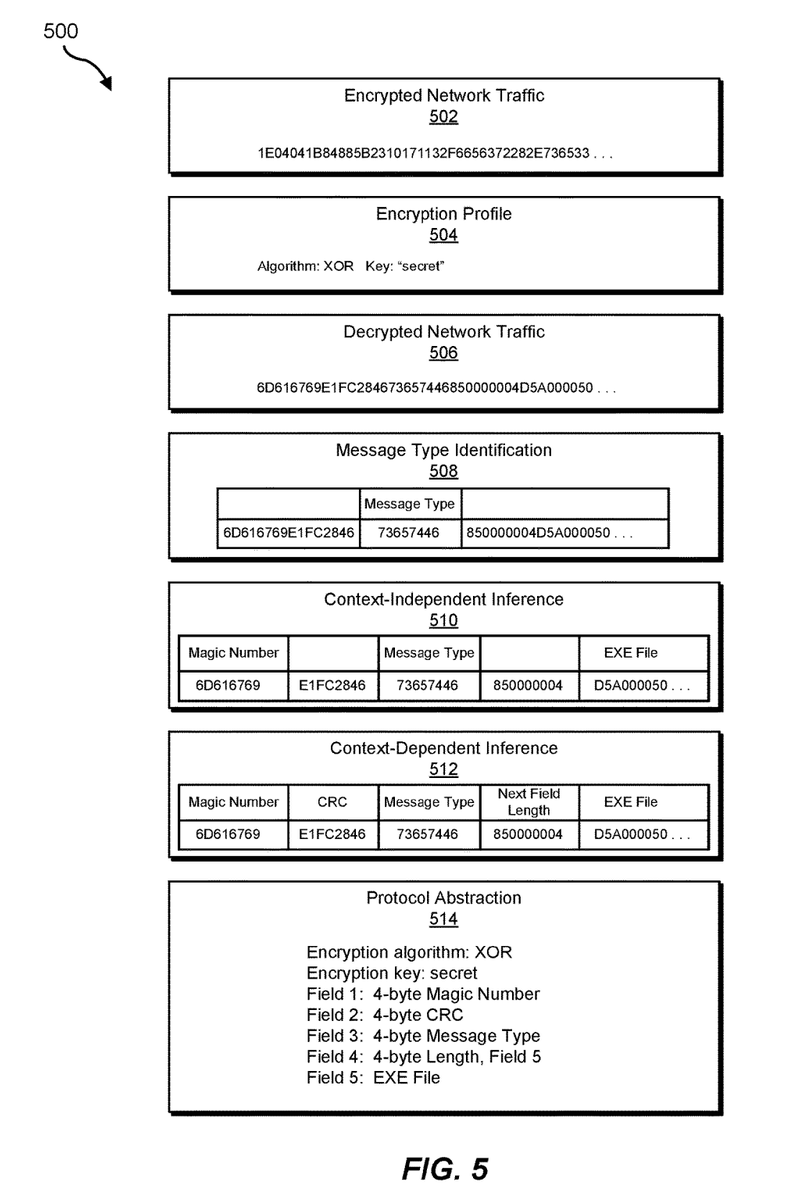
FIG. 5 is a block diagram of exemplary phases in reverse-engineering a malware protocol message.

FIG. 5 is a block diagram of exemplary phases 500 in reverse-engineering a malware protocol message. As illustrated in FIG. 5, exemplary phases 500 in reverse-engineering a malware protocol message may include encrypted network traffic 502, which may have been captured during an execution trace of a malware program or received from a malware-detection program. Encryption analysis of encrypted network traffic 502 may yield an encryption profile 504 that includes an encryption algorithm (XOR) and an encryption key ("secret"). Applying encryption profile 504 to encrypted network traffic 502 may yield decrypted network traffic 506.

After encryption analysis produces decrypted network traffic 506, a message type identification step described above in conjunction with step 304 in FIG. 3 may identify one or more message type fields, as shown in message type identification 508. After one or more message types have been identified in decrypted network traffic 506, context-independent field inference may identify fields such as a magic number and/or EXE file payload, as shown in context-independent inference 510. Context-dependent inference 512 may include additional context-dependent fields, such as a CRC field and a next field length field that indicates the size of a message field of variable length. Exemplary phases 500 in reverse-engineering a malware protocol message may conclude with protocol abstraction 514, which may include an encryption profile and descriptions of the size and contents of each field in the malware protocol.

As described in greater detail above, the systems and methods described herein may reverse-engineer malware protocols using a combination of encryption analysis that may identify encryption parameters and decrypts encrypted network traffic, message type analysis that may identify one or more message types in the decrypted network traffic, and field analysis that may identify the location, size, and type of fields within the identified messages. The systems and methods described herein may identify the various components of a malware protocol and produce a protocol abstraction that may be used to detect and identify malware incursions, develop security policies and systems to better protect computing systems, and remediate the effects of malware incursions. The systems and methods described herein may provide these benefits with little or no involvement by human experts.

Figure 6:
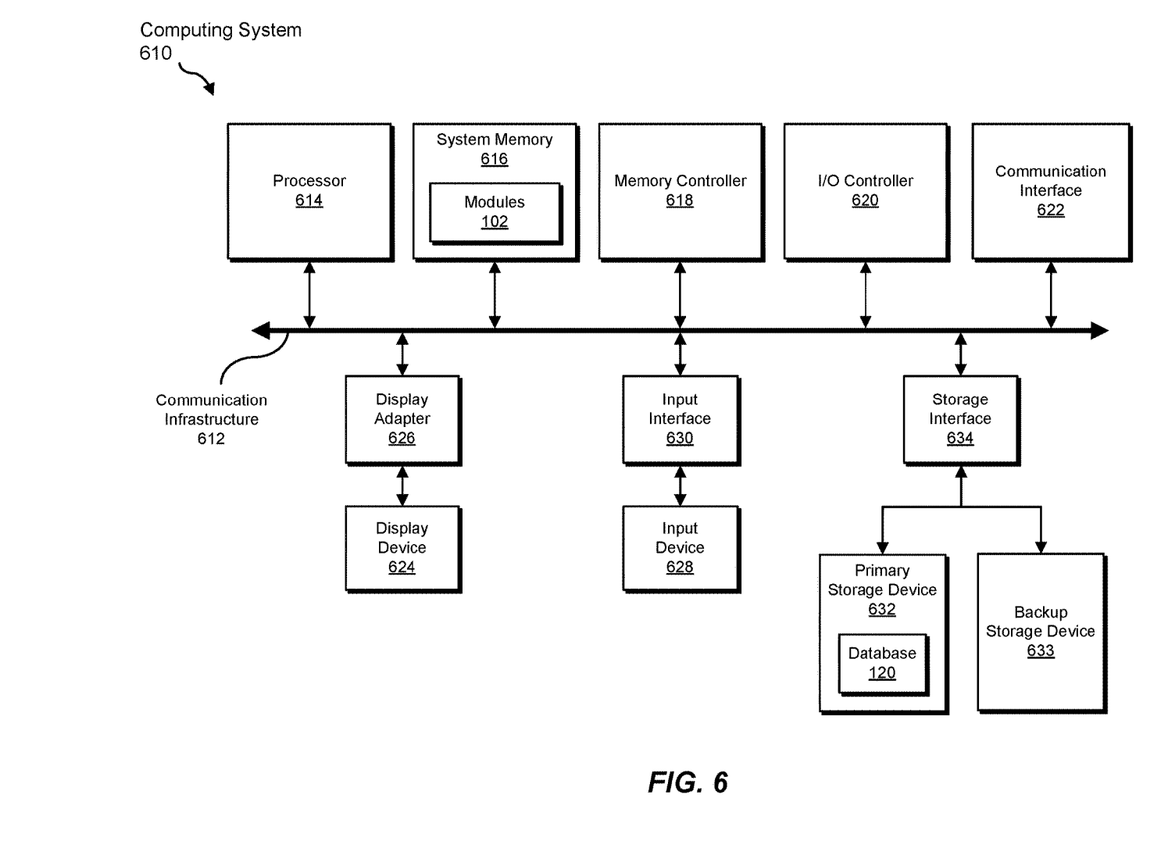
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
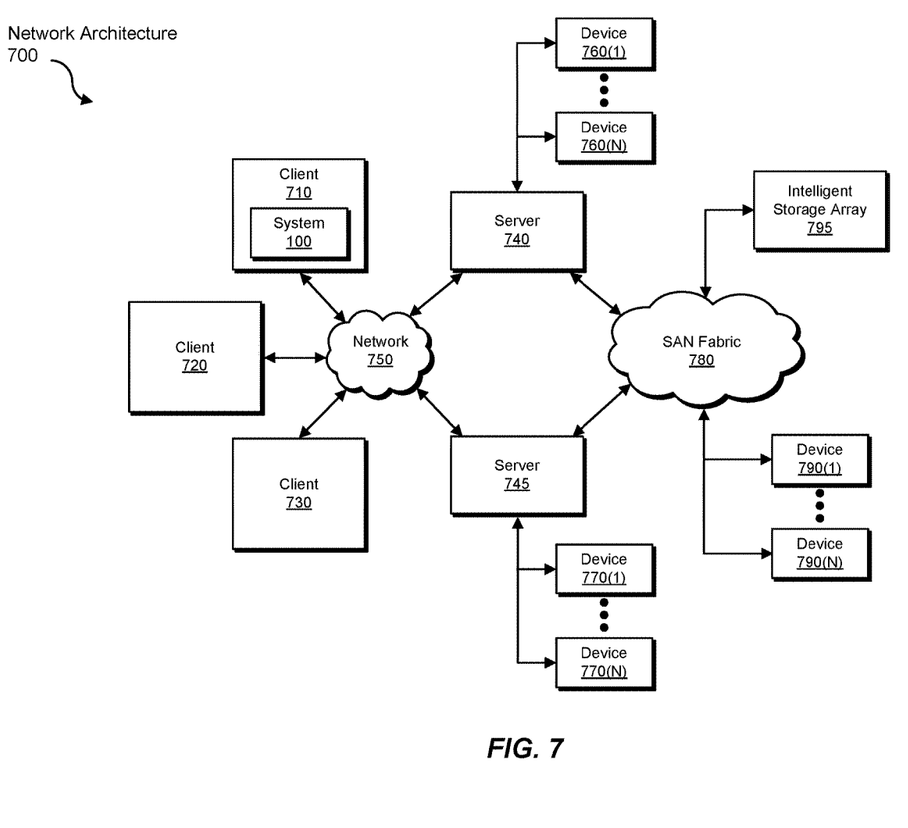
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for reverse-engineering malware protocols.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive encrypted network traffic to be transformed, transform the encrypted network traffic, output a result of the transformation to decrypt the network traffic, use the result of the transformation to reverse-engineer one or more malware protocols, and store the result of the transformation to detect malware attacks. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for reverse-engineering malware protocols, at least a portion of the method being performed by a computing device comprising at least one processor, the method comprising:
   decrypting, by the computing device, encrypted network traffic generated by a malware program, wherein decrypting the encrypted network traffic comprises:
      identifying at least one sequence of instructions in the malware program that generates encrypted network traffic;
      identifying an encryption algorithm used by the sequence of instructions by:
         identifying data input to the sequence of instructions and data output by the sequence of instructions; and
         identifying a known encryption algorithm that produces the data output by the sequence of instructions when provided the data input to the sequence of instructions;
      identifying at least one encryption key for the encrypted network traffic; and
      decrypting, using the identified encryption key, at least a portion of the encrypted network traffic;
   identifying, by the computing device, a message type field in the decrypted network traffic;
   identifying, by the computing device, a message in the decrypted network traffic with the identified message type; and
   inferring, by the computing device, at least a portion of a malware protocol used by the malware program by analyzing the identified message to identify a field type for a data field of the identified message of the identified message type.

2. The computer-implemented method of claim 1, wherein identifying the message type field comprises:
   identifying a plurality of request and response communication pairs in the decrypted network traffic; and
   identifying the message type field by identifying, in at least one subset of the plurality of request and response communication pairs, a request data field value in each request that corresponds to a response data field value in each response.

3. The computer-implemented method of claim 2, wherein identifying the message in the decrypted network traffic with the identified message type comprises identifying in the decrypted network traffic an additional subset of the plurality of request and response communication pairs, each request and response communication pair included in the additional subset of request and response communication pairs having the request data field value in the message type field of the request.

4. The computer-implemented method of claim 1, wherein identifying the field type of the data field comprises:
   determining that the data field contains context-independent data by determining that a field value in the data field is semantically independent from a context of the field value in the message;
   comparing the field value to a range of expected field values for the field type;
   identifying the field type based on the field value being within the range of expected field values for the field type.

5. The computer-implemented method of claim 4, wherein the context-independent data field is at least one of:
   a magic number;
   a network address;
   a time stamp;
   an executable file;
   an archive file; and
   a string.

6. The computer-implemented method of claim 1, wherein identifying the field type of the data field comprises:
   determining that the data field contains context-dependent data by determining that a field value in the data field corresponds to at least one of:
      the value of a property of the message;
      a property of a context-independent data field;
   comparing the field value to a range of expected field values for the identified message; and
   identifying the field type based on the field value being within the range of expected field values for the identified message.

7. The computer-implemented method of claim 6, wherein the context-dependent data field is at least one of:
   a cyclic redundancy check value;
   a field-length value;
   an array-length value; and
   an offset value.

8. The computer-implemented method of claim 1, wherein identifying the field type of the data field comprises determining that the data field contains additionally encrypted data.

9. The computer-implemented method of claim 1, wherein inferring the portion of the protocol used by the malware program further comprises abstracting a specification for the protocol by at least one of:
   reporting whether the protocol encrypts all of each message or a portion of each message;
   reporting an encryption algorithm used by the protocol;
   reporting at least one encryption key used by the protocol;
   reporting message type fields used by the protocol;
   reporting message type values used by the protocol; and
   reporting data field types used by the protocol.

10. The computer-implemented method of claim 1, wherein decrypting the encrypted network traffic further comprises:
   receiving encrypted network traffic collected from the malware program;
   identifying an encryption key for the received encrypted network traffic; and
   decrypting the received encrypted network traffic using the identified encryption key for the received encrypted network traffic.

11. The computer-implemented method of claim 10, wherein identifying the encryption key for the received encrypted network traffic comprises at least one of:
   identifying a recognized encryption key known to be used by the malware program;
   identifying the encryption key for the received encrypted network traffic by:
      applying at least one candidate encryption key included in a set of candidate encryption keys to decrypt at least a portion of the received encrypted network traffic;
      calculating an entropy metric for the network traffic decrypted using the candidate encryption key;
      identifying the encryption key for the received encrypted network traffic by determining that the entropy metric for the network traffic decrypted using the candidate encryption key is below a threshold.

12. The method of claim 1, wherein decrypting the encrypted network traffic further comprises determining that the malware program encrypts data to be transferred using at least one of:
   a bitwise exclusive-or to combine input data with an encryption key; and
   a Rivest Cipher 4 that uses a randomly generated encryption key.

13. A system for reverse-engineering malware protocols, the system comprising:
   a decryption module, stored in memory, that decrypts encrypted network traffic generated by a malware program by:
      identifying at least one sequence of instructions in the malware program that generates encrypted network traffic;
      identifying an encryption algorithm used by the sequence of instructions by:
         identifying data input to the sequence of instructions and data output by the sequence of instructions; and
         identifying a known encryption algorithm that produces the data output by the sequence of instructions when provided the data input to the sequence of instructions;
      identifying at least one encryption key for the encrypted network traffic; and
      decrypting, using the identified encryption key, at least a portion of the encrypted network traffic;
   a message type module, stored in memory, that identifies a message type field in the decrypted network traffic;
   a field type module, stored in memory, that identifies a message in the decrypted network traffic with the identified message type;
   an analysis module, stored in memory, that infers at least a portion of a malware protocol used by the malware program by analyzing the identified message to identify a field type for a data field of the identified message of the identified message type; and
   at least one physical processor configured to execute the decryption module, the message type module, the field type module, and the analysis module.

14. The system of claim 13, wherein the message type module identifies the message type field by:
   identifying a plurality of request and response communication pairs in the decrypted network traffic; and
   identifying the message type field by identifying, in at least one subset of the plurality of request and response communication pairs, a request data field value in each request that corresponds to a response data field value in each response.

15. The system of claim 14, wherein the field type module identifies the message in the decrypted network traffic with the identified message type by identifying in the decrypted network traffic an additional subset of the plurality of request and response communication pairs, each request and response communication pair included in the additional subset of request and response communication pairs having the request data field value in the message type field of the request.

16. The system of claim 13, wherein the analysis module identifies the field type of the data field by:
   determining that the data field contains context-independent data by determining that a field value in the data field is semantically independent from a context of the field value in the message;
   comparing the field value to a range of expected field values for the field type;
   identifying the field type based on the field value being within the range of expected field values for the field type.

17. The system of claim 16, wherein the context-independent data field is at least one of:
   a magic number;
   a network address;
   a time stamp;
   an executable file;
   an archive file; and
   a string.

18. The system of claim 13, wherein the analysis module identifies the field type of the data field by:
  determining that the data field contains context-dependent data by determining that a field value in the data field corresponds to at least one of:
    the value of a property of the message;
    a property of a context-independent data field;
  comparing the field value to a range of expected field values for the identified message; and
  identifying the field type based on the field value being within the range of expected field values for the identified message.

19. The system of claim 13, wherein the analysis module identifies the field type of the data field by determining that the data field contains additionally encrypted data.

20. A non-transitory computer-readable medium comprising one or more computer-readable instructions that, when executed by at least one processor of a computing device, cause the computing device to:
  decrypt encrypted network traffic generated by a malware program by:
    identifying at least one sequence of instructions in the malware program that generates encrypted network traffic;
    identifying an encryption algorithm used by the sequence of instructions by:
      identifying data input to the sequence of instructions and data output by the sequence of instructions; and
      identifying a known encryption algorithm that produces the data output by the sequence of instructions when provided the data input to the sequence of instructions;
    identifying at least one encryption key for the encrypted network traffic; and
    decrypting, using the identified encryption key, at least a portion of the encrypted network traffic;
  identify a message type field in the decrypted network traffic;
  identify a message in the decrypted network traffic with the identified message type; and
  infer at least a portion of a malware protocol used by the malware program by analyzing the identified message to identify a field type for a data field of the identified message of the identified message type.

* * * * *